(12) United States Patent
Gappelberg et al.

(10) Patent No.: US 6,334,697 B1
(45) Date of Patent: Jan. 1, 2002

(54) TAXI HAILING DEVICE

(76) Inventors: Evan Gappelberg, 159 W. 53$^{rd}$ St., Apt. 38B, New York, NY (US) 10019; Irving Schaffer, 178 Deepwood Rd., Fairfield, CT (US) 06430; Christopher Wilson, 20 River Rd., #4C, New York, NY (US) 10044

( * ) Notice: Subject to any disclaimer, the term of this patent is extended or adjusted under 35 U.S.C. 154(b) by 0 days.

(21) Appl. No.: 09/260,944

(22) Filed: Mar. 2, 1999

Related U.S. Application Data

(63) Continuation-in-part of application No. 08/588,126, filed on Jan. 18, 1996, now Pat. No. 5,642,931.

(51) Int. Cl.$^7$ ................................................. F21L 4/00
(52) U.S. Cl. ......................... 362/186; 362/202; 362/102
(58) Field of Search ................................. 362/102, 202, 362/223, 356; 340/321

(56) References Cited

U.S. PATENT DOCUMENTS

| | | | | |
|---|---|---|---|---|
| 3,846,750 A | * | 11/1974 | Kearsley | 340/983 |
| 4,090,186 A | * | 5/1978 | Renner | 340/908 |
| 5,001,455 A | * | 3/1991 | Starchevich | 340/332 |
| 5,036,442 A | * | 7/1991 | Brown | 362/102 |
| 5,152,601 A | * | 10/1992 | Ferng | 362/183 |
| 5,585,783 A | * | 12/1996 | Hall | 340/473 |
| 5,642,931 A | * | 7/1997 | Gappelberg | 362/186 |
| 5,667,293 A | * | 9/1997 | Own | 362/184 |

\* cited by examiner

Primary Examiner—Alan Cariaso
Assistant Examiner—Hargobind S. Sawhney
(74) Attorney, Agent, or Firm—Steven Horowitz

(57) ABSTRACT

A hand-held beacon uniquely suited for hailing taxicabs is an excellent signaling device that is easy to operate and adaptable for carrying. Pushing a button on the handle portion closes a circuit to cause a light source at the top of the handle portion to beam light. In some embodiments, a reflective, blocking layer adhesively attached to the inside of the device focuses the light in a desired direction. Also desirably, the device has a plurality of annular bands. The reflective layer, which reflects light coming from outside in some embodiments is reflective also on the inside for enhanced distribution of light through the light element.

2 Claims, 9 Drawing Sheets

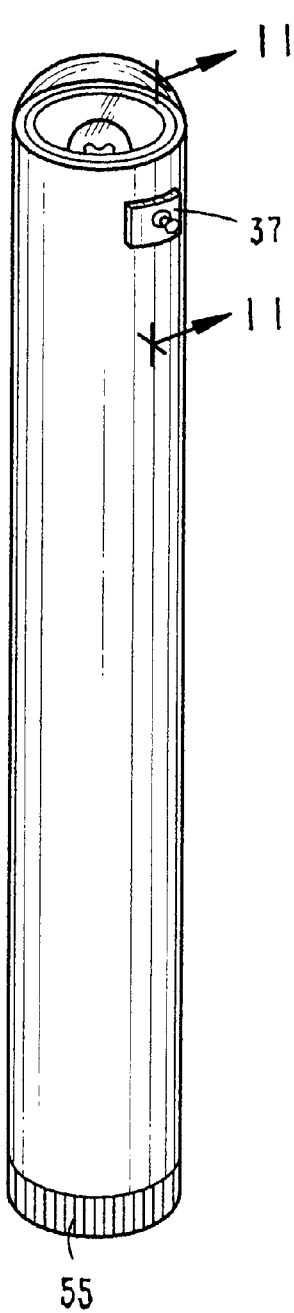
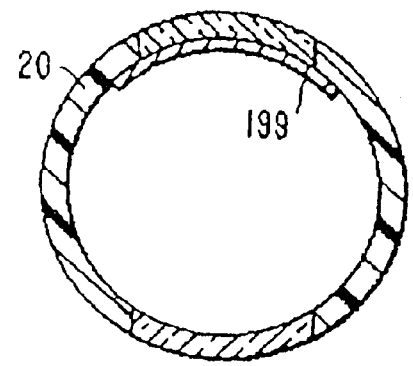
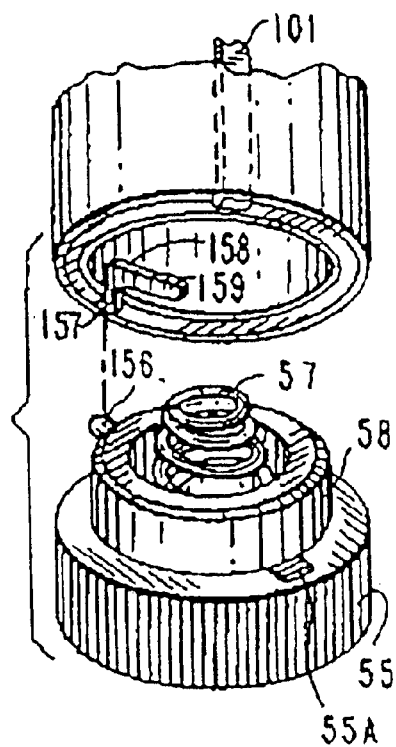
FIG. 7
FIG. 8
FIG. 9

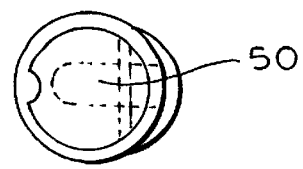
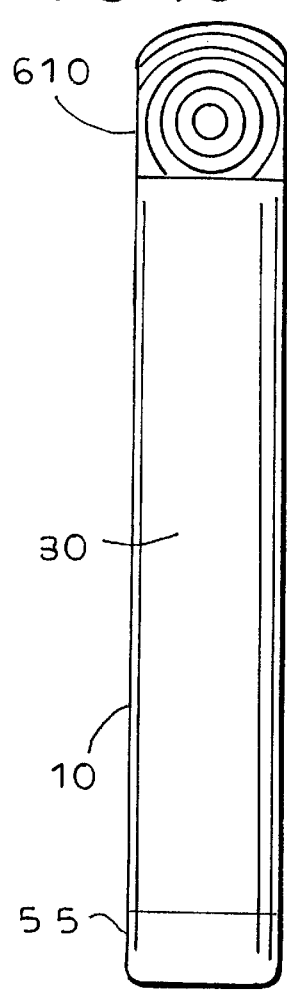
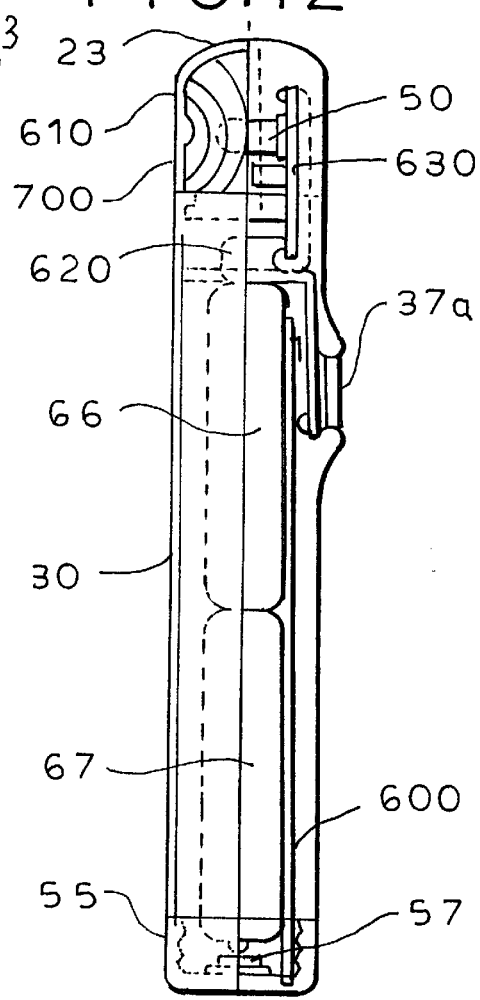
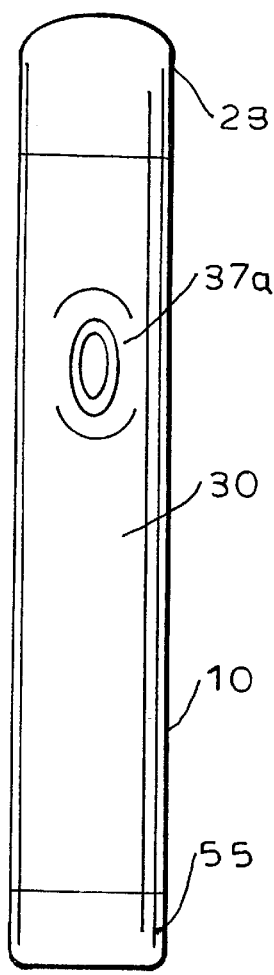
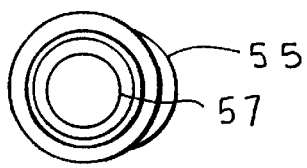

FIG. 17
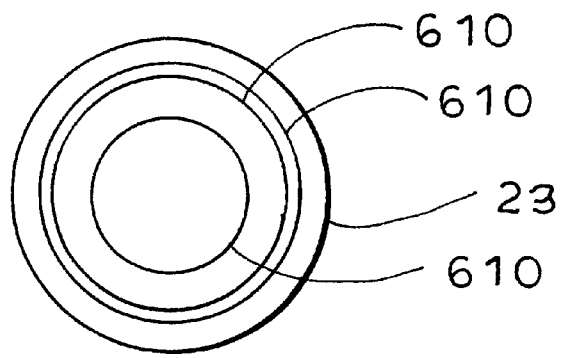
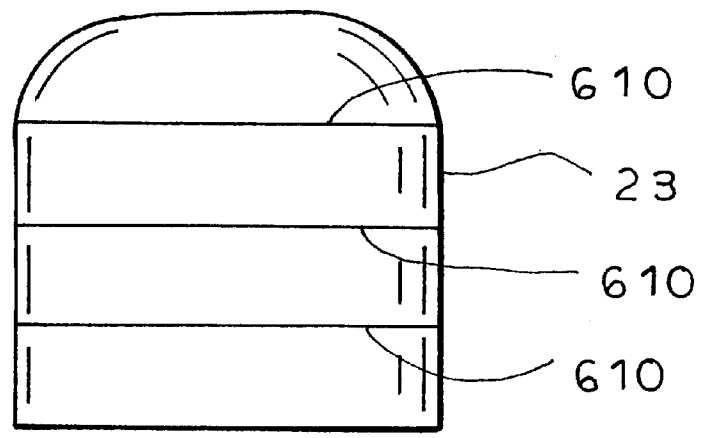
FIG. 18

DESIGN WITH NATIONAL SEMI LM 3909

DESIGN WITH CDT 3200-7B

TAXI HAILING DEVICE

This application is a C-I-P of Ser. No. 08/588,126 filed Jan. 18, 1996, U.S. Pat. No. 5,642,931.

PRIOR ART

Applicant hereby incorporates by reference into this patent application U.S. Pat. No. 5,642,931 to Gappelberg.

Light signaling devices are known in the prior art either to direct airplanes taxiing on the runway (e.g., U.S. Pat. No. 5,392,203) or for policemen to direct pedestrians or traffic. None of these devices, however, are uniquely suited for hailing taxicabs, as the present invention is.

U.S. Pat. No. 4,231,077 to Joyce discloses a light toy having a light source such as a bulb that sends a beam of light into a nonopaque tube along its axis. The beam is reflected back into the tube by a reflective surface on the inner side of the cap at the other end. It could be used for signaling or as a toy. This device is ill suited to hailing taxicabs. One would have to walk around with a science fiction looking device with a light element sticking out of it. Furthermore, it would not be easily understood by taxicab drivers to indicate an attempt to signal a ride.

U.S. Pat. No. 5,287,255 to Strodtman discloses a combination flashlight-baton in which the tail end of the device flashlight barrel has telescoping tubular members attached to a spring that extends outward with a snap of the wrist. To extend the baton, the user holds the flashlight by the handle with the tail end pointing away and sharply snaps the wrist forward in a slinging action so that the telescoping members are extended outwardly due to the centrifugal force. While the Strodtman patent contains telescoping tubular members that are shifted outward when the device is in "use" position, this device too is ill suited for hailing a taxicab and would not be instantly recognized by taxicab drivers as an attempt to signal a ride. Furthermore, the sharp snapping action that is required to activate the Strodtman device is singularly ill suited to hailing a taxicab amidst others doing the same in a crowded area. In addition, since the light extends axially outward rather than radially it is not suited for signaling at all but rather for shedding light on another object.

Numerous devices are known for modification of flashlights but none of these are uniquely suited for hailing a taxicab. For example, U.S. Pat. No. 4,697,228 to Mui discloses a collapsible light wand formed from a telescopic tube assembly comprised of a plurality of overlapping translucent tube sections, the outermost tube section being removably attachable to the light source end of a flashlight. Other examples are U.S. Pat. No. 5,383,103 to Pasch and U.S. Pat. No. 5,307,251 to Shaffer which disclose a flashlight wand attachments for use as pedestrian crossing devices and to direct traffic. These devices are also not suited for hailing a taxicab. Since the light extends axially and not radially these devices would not be visible from all directions. In addition, the devices would not be recognized as an attempt to signal for a ride in a taxicab. The devices also do not contain an effective mechanism for shifting from carry position to "use" position.

U.S. Pat. Nos. 4,646,213 to Fanelli, 4,186,430 to Britton and 147,204 to Walton each teach the idea of a telescoping lantern containing a spring held light source, in this case a candle, that is held within a cylindrical housing. None of these would be suitable for use in hailing a taxicab and also suffer from the drawbacks already mentioned.

U.S. Pat. No. 5,001,455 to Starchevich reports a portable signaling device for hailing a taxi. However, the Starchevich uses moving parts, and therefore is subject to wear, which limits the useful life of such a device.

U.S. Pat. No. 5,412,548 to Yee reports a multi-function device that has flash lighting, signaling and lantern functionalities. However, due to the size, etc. of the device reported in Yee, that device is not well suited for haling a taxicab.

For both safety and convenience, there is a pressing need for a hand held beacon uniquely suited for hailing taxicabs, particularly at night, but also adaptable for daytime use, especially one that is convenient to carry, easy to operate and adaptable to being carried by hand, in carrying cases, purses, clothing pockets such as coats, jackets, pants or suit, and the like when the light is in off mode. It is especially important that the device, when held and activated, be one that would be instantly highly visible to, and recognized by, taxicab drivers as an attempt to signal for a ride in a taxicab.

SUMMARY OF THE INVENTION

The present invention is a hand-held beacon uniquely suited to hailing taxicabs. In general, it is an excellent signaling device that is easy to operate and adaptable for carrying. By pushing a button that closes a circuit causing a light element, such as a bulb or an LED, at the top of the handle portion to beam light outward to signal one's presence and desire to retain a taxicab.

In a preferred embodiment of the beacon of the present invention, a light element is covered by a shell. The shell, at least in part, does not block the passage of light. It is further preferred that at least part of the shell is coated, desirably the internal surface, with a reflective material. In a further preferred embodiment of the present invention, this reflective layer is located everywhere on the inside of the shell except at portions thereof that form an arc of about 90 degrees. It is still further preferred that the beacon shell of the present invention has annular bands. The inside reflective layer serves the double purpose of (i) enhancing the light emitting capacity of the light element by reflecting light coming from outside the entire device, and (ii) blocking light from the bulb from being emitted other than through the desired areas. As a result, light only escapes through the transparent or translucent region in a directed fashion.

When not needed for use, the device is adaptable for carrying and can be placed into a pocket, purse, or small carrying case.

OBJECTS

It is therefore an object of the present invention to provide a hand-held beacon having a battery operated light element that can be used to signal taxicabs during the day and night.

It is also an object of the present invention to provide a hand-held beacon having a light element within a shell wherein the shell has an inside layer of reflective material that serves the twofold purpose of (i) blocking light from being emitted other than through the desired arc and, (ii) reflecting light entering the light element tube from outside the device.

It is also an object of the present invention to provide a hand-held beacon having a light element within a shell wherein the shell has an inside layer of reflective material that is attached by transparent glue on all or part of the surface of the reflective layer or where the reflective layer consists of reflective paint sprayed onto the inside of the shell.

These and other objects will become increasingly apparent to those of ordinary skill in the art by reference to the following description and to the drawings.

BRIEF DESCRIPTION OF THE DRAWINGS

FIG. 7 depicts a perspective view of an alternative embodiment of the beacon of the present invention;

FIG. 8 depicts a cross-sectional view of the alternative embodiment of the beacon of the present invention taken along line 13—13 of FIG. 7;

FIG. 9 depicts a partial exploded perspective view of an alternative embodiment of the detachable bottom of the handle portion of the beacon of the present invention;

FIG. 12 depicts a side view of another embodiment of the beacon of the present invention;

FIG. 13 depicts a top view of the detachable bottom of the handle portion of the beacon of the present invention;

FIG. 14 depicts a bottom view of the shell portion of the beacon of the present invention;

FIG. 15 depicts a front view of the beacon of the present invention;

FIG. 16 depicts a back view of the beacon of the present invention;

FIG. 17 depicts a top view of a shell of a beacon of the present invention with annular groves that circle the shell;

FIG. 18 depicts a side view of a shell of a beacon of the present invention with annular groves that circle the shell;

DETAILED DESCRIPTION OF THE INVENTION

The General Structure of the Device

Figure 1:
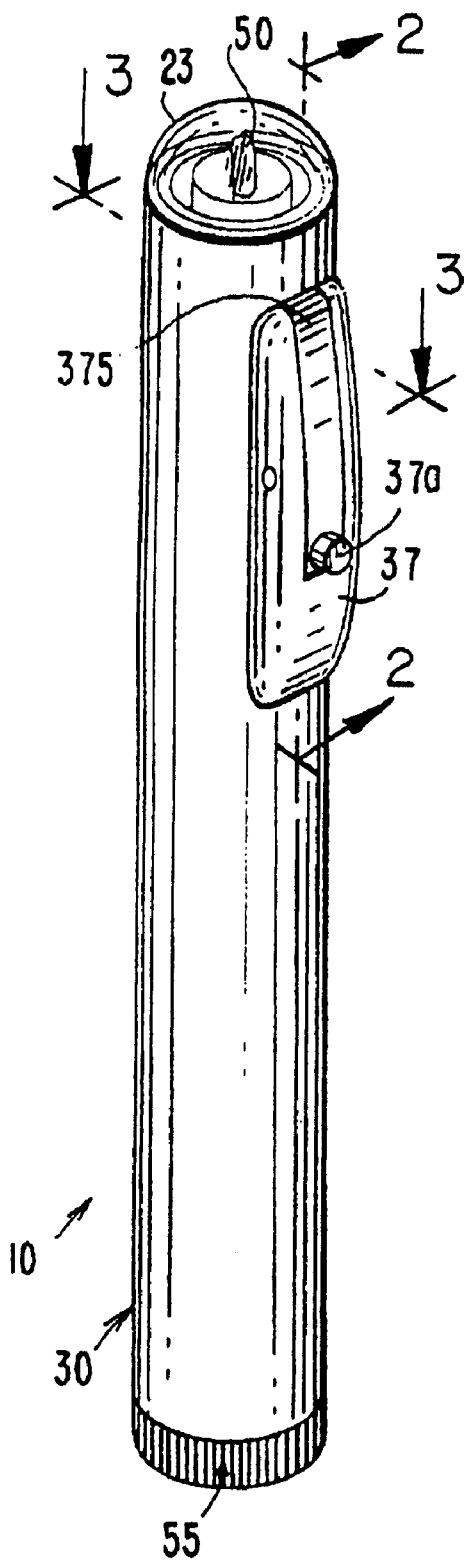
FIG. 1 is a perspective view of a preferred embodiment of a beacon in accordance with the present invention.

A seen in FIGS. 12–16, the device 10 is a beacon which is comprised of elongated tubular body portion 30 and a shell 23. Handle portion 30 is typically contains an inner contact strip 600 that connects the power means contact 57 in the detachable bottom 55 of the beacon to the beacon activating means 37a.

While tubular handle portion 30 can be of any conventional shape such as cylindrical, triangular, parallelopiped, pentangular, it is preferred that the tubular handle portion 30 is of a cylindrical shape. Additionally, tubular portion 30 can be comprised of one or more pieces although it is preferred that tubular portion 30 is made of one or two pieces and it is more preferred that tubular portion 30 is made of two approximately halves.

While the tubular portion can be made of any conventional material, plastics are particularly useful and ABS, modified styrene and polypropylene are preferred plastics for making the tubular portion of the present invention.

Contact strip 600 can be made of any conventional conducting material such as copper. In one embodiment of the present invention, the contact strip 600 is a conducting tube. However, in other embodiments, the contact strip is relatively narrow, for instance between about 1 and 10 mm, and more desirably between about 3 and 7 mm.

The signaling function of the beacon of the present invention is preformed by a light element 50. Light element 50 can be any conventional light source such as an incandescent light bulb, a fluorescent light bulb, a halogen light bulb, or a light emitting diode ("LED"). For example, a Xenon Star Gas-Filled Sub-Miniature Lamp powered by two AAA batteries may be used as the light element. A particularly useful light source for use in the present invention is a super-bright LED, such as a King-Bright™ LED.

When turned on, the light source can be on either continuously or discontinuously. It is preferred that the light source is on discontinuously. A light source that is on discontinuously can either have a fast or a slow frequency of turning on and off. It is further preferred that the discontinuous light source used in the beacon of the present invention have a fast frequency of turning on and off. It is still further preferred that the light source of the beacon of the present invention turns on and off fast, e.g., between about 1 and 30 times a second, and still more preferably the light source of the beacon of the present invention turns on and off between about 5 and 15 times a second, and it is most preferred that the light source of the present invention turns on and off about 6 to 8 times per second.

In addition to the number of times the light source is turned on and off, the duration of the on and off cycles can be such that the light source is on more than off, on and off for about equal times, or off more than on. It is preferred in the practice of the present invention that the light source is off more than it is on. It is further preferred that the light source of the present invention is off for at least about 65% of the on and off cycle, and it is still further preferred than the light source is off for at least about 75% of the on and off cycle. However, it is also preferred in the practice of the present invention that the light source is off for at least 10% of the on and off cycle.

It is also desired that the light source is able to produce an illumination of at least about 2000 minicandellas (mcd), and it is preferred that the light source is able to produce an illumination of at least about 4,000 mcd.

It is also desired that the wavelength of the maximum output of the light source is in the range of about 600 to about 680, desirable the wavelength of the maximum output of the light source is between about 620 and 660, and preferably the wavelength of the maximum output of the light source is between about 630 and 640. Additionally, it is desirable that substantially none of the light source's output is of a wavelength of is less than about 600 or greater than about, 680.

Desirably, the present invention uses AlInGaP or GaAlAs LEDs as they produce the desired wavelengths.

It is also desired that the light source produce a small angle of lightout. Preferably, the angle of lightout is less than about 15°, and more preferably, the angle of lightout is between about 8 and 10°.

When the light source used in the present invention is a LED, it is preferred that the LED is mounted on a circuit board 630 that is mounted in the back of shell 23. It is further preferred that the circuit board contains chips that control the frequency with which the LED is turned on and off in the preferred discontinuous embodiment. The circuit board also desirable contains one or more spring contacts to position the circuit board with respect to the positive terminal of battery 66 and contact strip 600.

While the circuit board may have a simple circuit comprising a capacitor and one or more resistors, it is preferred that the circuit includes a circuit board having a flasher chip such as the LM 3909 chip sold by National Semiconductor.

It is desired that when the circuit board includes an LM 3909 flasher chip, the circuit also includes one or more resistors and one or more capacitors to set the appropriate duel time and length of the on/off cycle. For example, the circuit might include two resistors of 47 and 150 Ohms and a 1000 microfarad capacitor.

The LM 3909 flasher chip is desired because it flashes under a low voltage, i.e., about 1.5 volts, and raises the system voltage so that a 1.5 volt battery can act as the sole power supply to activate an LED requiring, for example, 1.8 volts.

Figure 2:
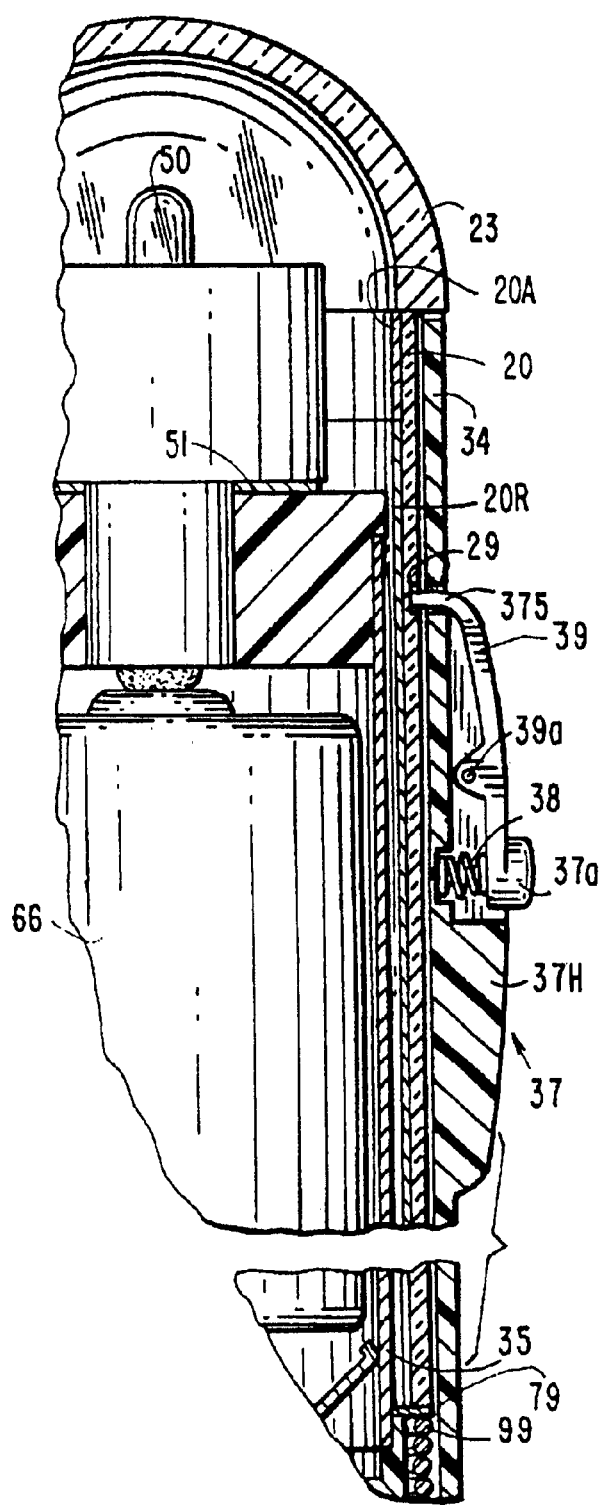
FIG. 2 depicts a cross-sectional view of a preferred embodiment of the present invention taken along line 2—2 of FIG. 1.
Figure 3:
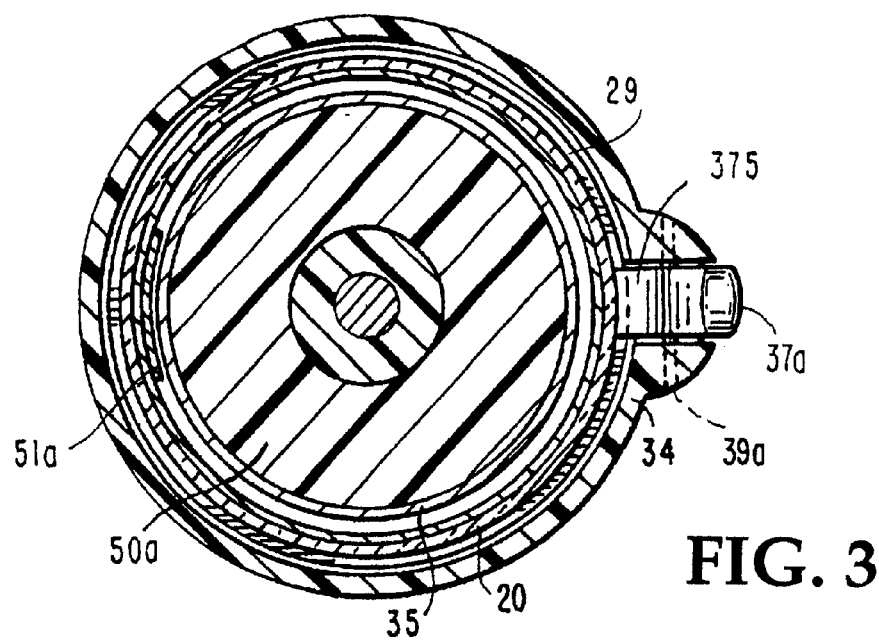
FIG. 3 depicts a cross-sectional view of a preferred embodiment of the present invention taken along line 3—3 of FIG. 1.
Figure 4:
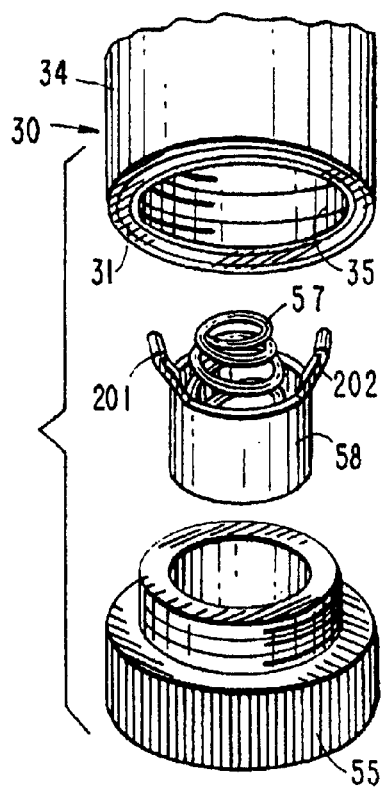
FIG. 4 depicts a partial exploded perspective view of the detachable bottom of the handle portion of the beacon of the present invention.

As seen in FIGS. 1, 2 and 7, in an embodiment using a bulb as the light source, bulb 50 fits snugly into a bulb holder 50*a*. For best results, bulb 50 should be a high intensity bulb. Bulb 50 has a bottom end which sits on and comes into contact with the positive terminal at the top of battery 66, the upper of two cylindrical batteries that are inserted one on top of the other in a conventional manner (lower battery's 67 positive terminal contacting upper battery's 66 negative terminal) into the hollow space of tubular handle portion 30 from its bottom. This insertion of batteries can be accomplished by screwing off the detachable bottom 55 of handle portion 30. Detachable bottom 55 has a coil spring 57 that fits into a cup 58*a* that fits into a housing or flange 58 and that extends upward. The negative terminal of battery 67, the lower of the two batteries, sits on coil spring 57 inside inner tube 35. Housing 58 for spring 57 has threading around to allow detachable bottom 55 to be screwed into the bottom of handle portion 30. In the primary variation of the detachable bottom 55 of the preferred embodiment of the beacon 10, as seen in FIG. 4, two metallic tabs 201, 202 jut out diagonally at the top of cup 58*a* in housing 58 for spring 57 to create a metal on metal connection between the housing 58 and contact strip 600 when the detachable bottom 55 is screwed in after insertion of the batteries.

Figure 5:
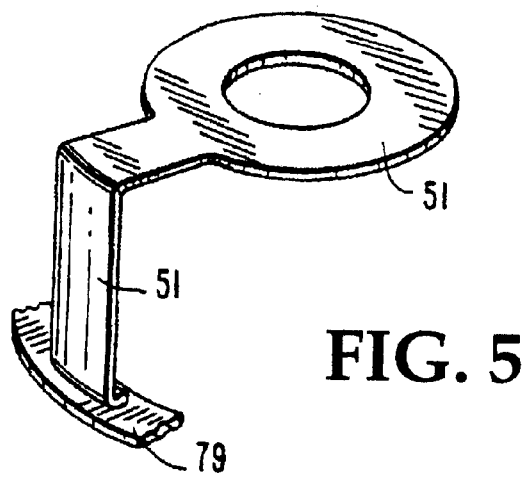
FIG. 5 depicts a perspective view of metallic clip attachment to the bulb contacting the annular metallic ring at the bottom end of the light element.
Figure 6:
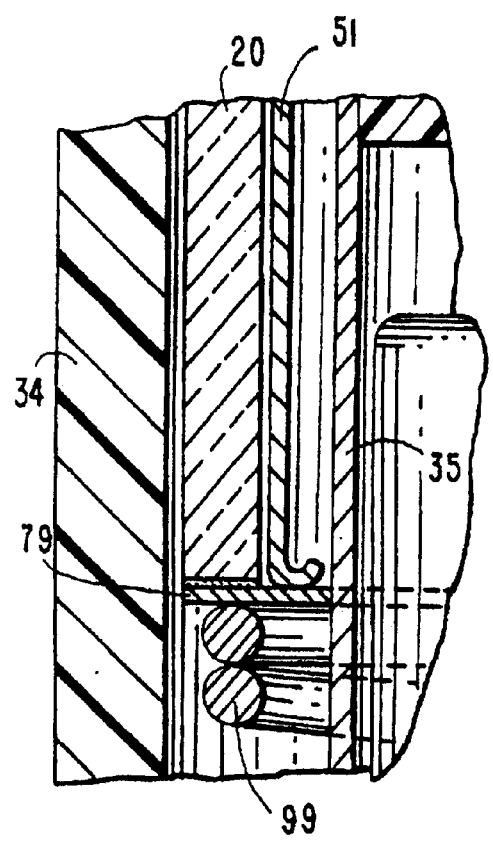
FIG. 6 depicts a partial cross-sectional view of the completed electric circuit in the preferred embodiment.

As seen in FIGS. 5–6, for the embodiment depicted in FIGS. 1–6, bulb 50 has attached to it a metal clip 51*a* that depends downward from metallic ring 51 surrounding the bulb 50.

In the embodiments where contact strip 600 forms a tube about the inner surface of handle portion 30, there is no need to ensure alignment between detachable bottom 55 and contact strip 600 since the entire inner surface is contact strip 600. It is also desired that detachable bottom 55 is flat on its bottom so the entire device 10 can stand in closed position on a desk as an attractive device.

Shell

As seen in FIGS. 12 and 14–16, shell 23 is a partly transparent or translucent cover for light source 50. Plastic is a useful material for making shell 23 and the lens area is desirably made of an acrylic of styrene plastic. It is desired that shell 23 is of a readily seen color such as red or international orange.

In a preferred embodiment of the beacon of the present invention, only a portion of shell 23 is transparent or translucent. Desirably, shell 23 is transparent or translucent in a portion corresponding to between about 5 and 120 degrees of its circumference. It is preferred that shell 23 is transparent or translucent in a portion corresponding to between about 15 and 90 degrees and it is more preferred that shell 23 is transparent or translucent in a portion corresponding to between about 30 and 60 degrees.

Typically, shell 23 has an outer diameter approximately equal to the outer diameter of handle portion 30. Preferably, the outer diameter of both shell 23 and handle portion 30 is between about 5 and 40 mm, more preferably, the outer diameter of both shell 23 and handle portion 30 is between about 10 and 30 mm, and still more preferably, the outer diameter of both shell 23 and handle portion 30 is between about 15 and 25 mm.

Preferred embodiments of shell 23 have one or more annular groves and/or ribs 610 that serve to better project the light from light source 50 and improve the visibility of the beacon in the desired direction. Annular groves and/or ribs 610 may function as prisms or diffraction gratings. While the annular groves and/or ribs 610 may be circle shell 23 as shown in FIGS. 17 and 18, it is preferred that annular groves and/or ribs 610 are located on the front side of the beacon as shown in FIG. 15. It is still further desired that the annular rings and/or groves 610 circle a portion of shell 23 that is substantially free of such annular groves and/or ribs 610.

Desirably, shell 23 has a lens 700 located along a radial surface of shell 23 and the axis of the light source 50 is preferably coincident with lens 700. Lens 700 typically has a diameter between about one half and one inch. It is preferred that lens 700 is effective to collate the lights emitted from the light source.

Typically, shell 23 has a thickness between about one and five eights of an inch with a preferred thickness of about three eights of an inch. The lens thickness is determined by the effective focal length to collate the emitted light.

Desirably, the annular groves or ribs are effective in improving the perception of the beacon of the present invention at a distance of between about 5 and 50 feet. In a preferred embodiment, the annular groves or ribs are fresno curves. It is also preferred that the annular groves or ribs are concentric with the lens. Another preferred aspect of the beacon of the present invention is that the annular groves or ribs are located on the interior surface of shell 23.

Figure 10:
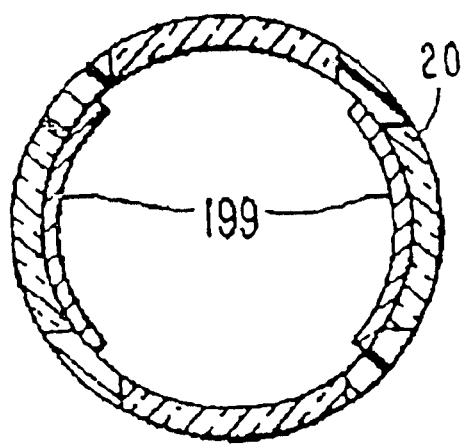
FIG. 10 depicts a cross-sectional view of a second version of the shell in an alternative embodiment of the beacon of the present invention.
Figure 11:
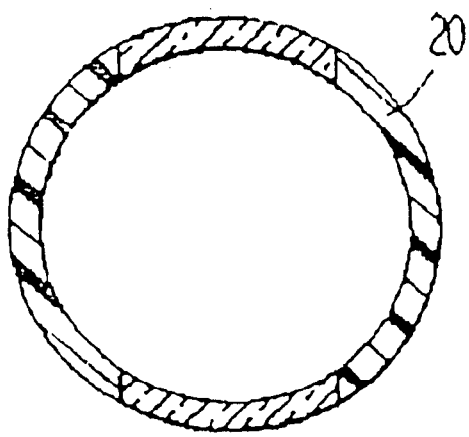
FIG. 11 depicts a cross-sectional view of a third version of the shell in an alternative embodiment of the beacon of the present invention with a transparent arc and regions of reflective material.
Figure 19:
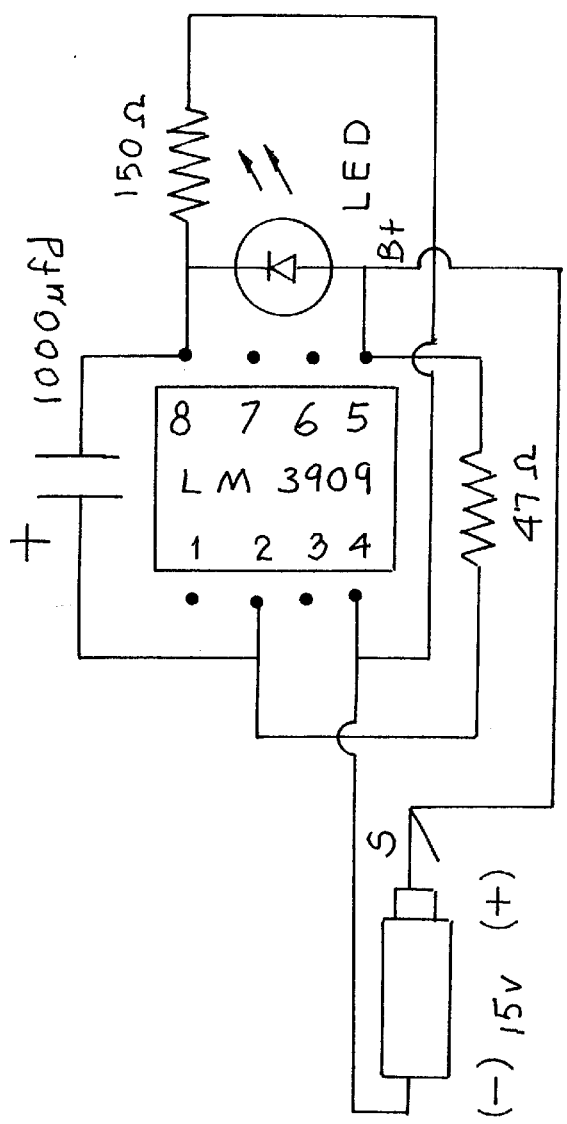
FIG. 19 depicts a circuit board schematic for use in one embodiment of the present invention that incorporates a National Semiconductor LM 3909 chip, a 1000 $\mu$farad capacitor, a 150 Ohm resistor and a 47 Ohm resistor a 1.5 v source of emf.
Figure 20:
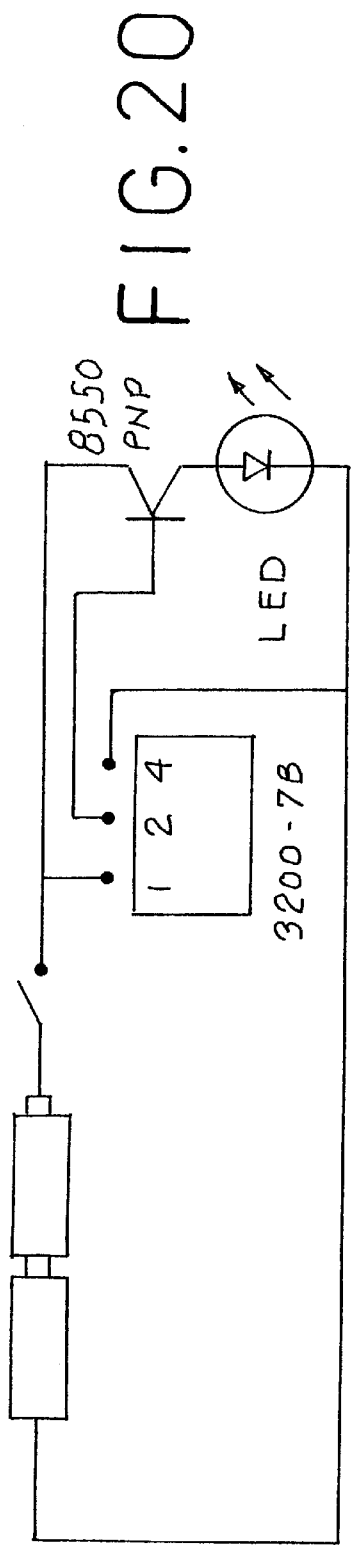
FIG. 20 depicts a circuit board schematic of use in an alternative embodiment of the present invention that incorporates a CDT 3200-7 B chip.

It is also preferred that the portions of the shell that are not intended to be transparent or translucent have a reflective material coating that is preferably on the inner surface of shell 23. embodiment, as seen in FIGS. 8 and 10, the shell 23 is a transparent cap having a thin layer of reflective material 199 adhering to the inside wall of shell 23. This material may consists of a thin layer of fabric type material reflective on the inside of shell 23 by transparent glue or paint. The reflective material can be the standard reflective material such as the kind used on bicycles to reflect light at night. Desirably, the reflective layer 199 is located everywhere on the inside of shell 23 except at portions thereof that are intended to be transparent or translucent. The inside reflective layer 199 serves the double purpose of (i) enhancing the light emitting capacity of the light element by reflecting light coming from outside the entire device, and (ii) blocking light from the bulb from being emitted other than through the desired areas of shell 23 that may be transparent or translucent. As a result, light only escapes through the transparent or translucent areas thus causing these areas to be boldly lit up, especially at night.

Activating the beacon

The device 10 is activated by pressing button 37a which closes a circuit including batteries 66 and 67, coil spring 57, contact strip 600, light source 50 fits and the positive terminal at the top of battery 66. Depending upon the power requirements of the light element, in some alternative embodiments, a single battery may be used instead of the pair 66 and 67.

The switch means activated by pressing button 37a can turn the device on until the device is manually turned off, or alternatively, the device is only turned on for so long as button 37a is depressed. The former configuration enables the user to hail a taxi without maintaining pressure, and therefore may be more comfortable. Because the light is very bright, there is minimal risk that the user will forget to turn the beacon off.

In use, a pedestrian holding the handle portion 30 of device 10 by hand presses button knob 37a lighting up the light element 50. As a result, the light travels from light element 50 through shell 23 in a manner directed by the portions of shell 23 that are either transparent or translucent. Shell 23 being brightly lit immediately signals taxicabs that the holder of the device 10 desires a ride in a taxi.

In a preferred embodiment, the placement of the light element, the shape and configuration of shell 23, including the location of the lens area, emitted light from shell 23 in a radial manner and desirably not in an axially direction.

Generally, the entire beacon device 10 is lightweight since in a preferred embodiment, it is mostly plastic.

In addition, while the preferred embodiment may utilize two batteries 66, 67 that are of AAA size, other sizes and amounts of batteries may also be used to power a bright light. As best seen in FIG. 12, handle portion 30 has an internal annular rib 620 to position battery 66 in place.

In an alternative embodiment of the beacon of the present invention, the tubular portion is of a diameter that is similar to that of a half dollar and contains a 3 volt battery such as a Li battery. The height of the beacon of this embodiment is about a half inch. The light source is mounted in the tubular portion and is covered by the shell head with the switch means located on the side not having the light source.

In another aspect of the invention of the present invention, a taxicab is hailed by flashing a light between about 1 and 30 times per second, more desirably between about 5 and 15 times a second in a manner in which the light that is flashed is off more than it is on and more desirably, the light is off for between about 10 and 65% of the on/off cycle. It is still further preferred that the light emitted has a wavelength between about 600 and 680.

In another embodiment of the present invention, a taxicab is hailed by flashing a stationary device containing a plurality of LEDs with a maximum wavelength in the appropriate range at a frequency as described above. Such a device might be powered by a conventional line current, such as a 120 volt system.

In using the beacon of the present invention, the beacon is position within the vicinity of a street where there is a reasonable likelihood of finding a taxicab with a vacancy. Typically, the beacon will be between such a street and about six feet from the edge of such a street. Additionally, the beacon will between about 3 feet 6 inches from the ground and about 15 feet from the ground. When the beacon is mounted in a stationary position, it is likely to be further from the street and higher whereas when the beacon is in a hand-held device, the height of the beacon from the street will depend upon the position that is within the comfort range of the person holding the beacon.

With respect to the above description, it is to be realized that the optimum dimensional relationship for the parts of the invention include variations in size, materials, shape, form, function and manner of operation, assembly and use, which are deemed readily apparent and obvious to one skilled in the art, and all equivalent relationships to those illustrated in the drawings and described in the specification are intended to be encompassed by the present invention.

Having described and illustrated the present invention in a preferred embodiment, it should be apparent that numerous modifications may be made by those skilled in the art in order to fit other situations and the invention is not considered limited to the specific examples chosen for purposes of illustration, and includes all modifications and variations that do not depart from the spirit and scope of this invention as claimed in the following claims and reasonable equivalents to the claimed elements.

What is claimed is:

1. A battery-powered beacon for hailing taxis comprising:
    (i) a tubular handle portion having a contact strip inside said tubular handle portion, said tubular handle portion essentially comprising an open ended tube;
    (ii) a bottom, said bottom having a contact means that is positioned so as to make electrical contact between a first terminal of said power means and said contact strip;
    (iii) a top shell having a lens portion on a radial surface, the shell further comprising a plurality of annular bands about the front face of the shell;
    (iv) a light element positioned so that the axis of said light element is aligned with said lens, said light element being in electrical contact with a second terminal of said power means and said contact strip;
    (v) a switch means for opening and closing the electrical circuit comprising said power means, said contact strip, said first terminal contact, said second terminal contact and said light means; and
    (vi) a flashing means that is effective to turn said light element on and off between about 1 and 30 times per second.

2. A battery-powered beacon for hailing taxis comprising:
    (i) a tubular handle portion having a contact strip inside said tubular handle portion, said tubular handle portion essentially comprising an open ended tube;
    (ii) a bottom, said bottom having a spring that is positioned so as to make electrical contact between a first terminal of said power means and said contact strip;
    (iii) a light element positioned so as to make electrical contact between a second terminal of said power means and said contact strip;
    (iv) a switch means for opening and closing the electrical circuit comprising said power means, said contact strip, said first terminal contact, said second terminal contact and said light element;
    (v) a flashing means effective to create an on/off cycle of between about 1 and 30 per second; and
    (vi) a light element covering shell, said light element covering shell adapted to transmit the light emitted by said light element through a radial portion of the shell between about 5 and 120 degrees of the circumference of the shell, the shell further comprising a plurality of annular bands about the front face of the shell.

* * * * *